United States Patent [19]

Szush, Jr.

[11] Patent Number: 4,569,262

[45] Date of Patent: Feb. 11, 1986

[54] TOOL HOLDER

[76] Inventor: John J. Szush, Jr., 659 Hickory Ave., Harahan, La. 70123

[21] Appl. No.: 438,319

[22] Filed: Nov. 1, 1982

[51] Int. Cl.$^4$ ............................................. B23B 29/26
[52] U.S. Cl. ..................................... 82/36 R; 407/91; 407/111
[58] Field of Search ....................... 82/36 R, 37, 36 B; 407/99, 70, 71, 67, 69, 111, 91, 109

[56] References Cited

U.S. PATENT DOCUMENTS

| 989,674 | 4/1911 | Weiss | 407/91 |
| 2,363,215 | 11/1944 | Williams | 82/37 |
| 2,399,271 | 4/1946 | Vonada | 82/36 R |
| 2,634,646 | 4/1953 | Clatfelter | 82/36 R |
| 2,711,664 | 6/1955 | Misuraca | 82/37 |
| 3,191,471 | 6/1965 | Stewart | 82/36 R |

FOREIGN PATENT DOCUMENTS

| 19851 | of 1909 | United Kingdom | 82/37 |
| 964419 | 7/1964 | United Kingdom | 407/109 |

OTHER PUBLICATIONS

"Armstrong Tools" Catalog 880B, p. 147, Copyright 1978.

Primary Examiner—Leonidas Vlachos
Attorney, Agent, or Firm—John F. Sieberth

[57] ABSTRACT

The holder comprises a pair of clamp members fitted with recesses to grasp a linear segment of a tool. These members are pivotally secured together on one side and secured by machine screws or the like near the opposite side. The lower clamp member is fastened in such a way that the upper clamp member may undergo pivotal movement relative to the fastened lower clamp member when the machine screws or the like are loosened. Particularly desirable combinations and positioning of parts for effecting such fastening are described. Also described are (i) a particularly desirable interlocking construction for pivotally securing the clamp members together along one side without actually fastening them together along that side, and (ii) other preferred features which may be employed in the device.

21 Claims, 5 Drawing Figures

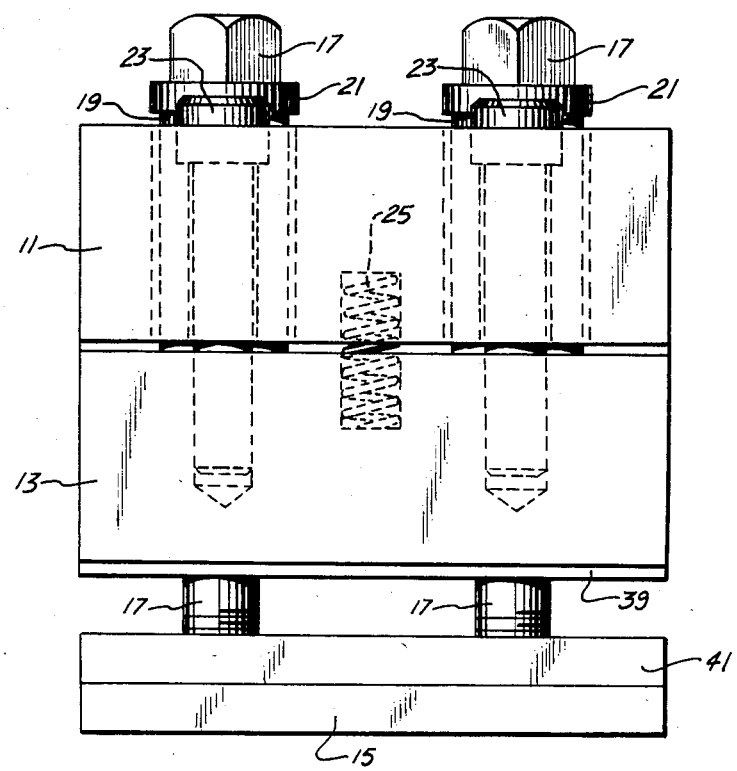
FIG. 3.
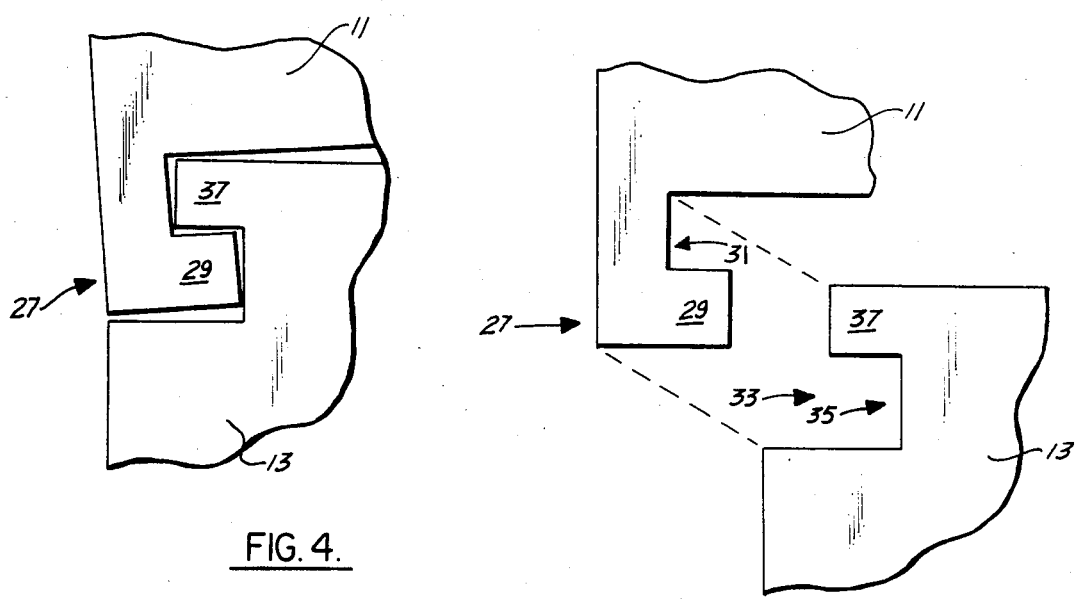
FIG. 4.
FIG. 5.

TOOL HOLDER

TECHNICAL FIELD

This invention relates primarily to machine tools, and more particularly to adjustable holders for tools such as boring bars and the like.

BACKGROUND

In machining operations it is often necessary to hold tools firmly in place on engine lathes or other similar equipment. For example, in heavy duty boring, the boring bar must be securely fastened on the lathe in the proper position relative to the chuck holding the workpiece. Although holders have been designed and are available for doing this job, they leave much to be desired, particularly in the areas of durability, alignability, and adjustability.

It is believed that this invention fulfills a need heretofore extant in the art, as it provides a tool holder having a desirable combination of improved durability, improved alignability, and improved adjustability.

SUMMARY OF THE INVENTION

Pursuant to this invention an adjustable holder for tools is provided which comprises:
  (a) a lower clamp member having at least one linear recess therein adapted to snugly receive a lower portion of a linear segment of a tool;
  (b) an upper clamp member adapted to be positioned on top of said lower clamp member, said upper clamp member having at least one linear recess therein adapted to snugly receive an upper portion of a linear segment of the tool above the lower portion of said segment received by said lower clamp member,
  (c) means adapted to secure said clamp members together along one side thereof and to enable pivotal movement of said upper clamp member relative to said lower clamp member;
  (d) securing means adapted to secure said clamp members together, said securing means being positioned in proximity to the side of said clamp members opposite the side secured by the means of (c); and
  (e) fastening means adapted to secure said lower clamp member to a support member for said holder whereby said upper clamp member may undergo pivotal movement relative to the fastened lower clamp member on loosening the securing means of (d).

It will be noted that the tool holders of this invention can be securely fastened to the lathe or other support to which they are to be attached and the lower clamp member will remain securely attached even though the upper clamp member is loosened from the lower clamp member. Thus the amount by which the boring bar or other tool extends from the holder may be readily adjusted without changing the alignment relative to the workpiece of either the holder or the tool itself. This is accomplished simply by loosening the securing means of (d), making the desired adjustment in tool extension, and then tightening the securing means of (d). During these simple steps the upper clamp member is freed to undergo a small amount of pivotal movement around the axis of the means of (c) when the means of (d) are loosened, and yet the upper clamp member remains in proper orientation so that when the securing means of (d) are tightened, the upper clamp member returns to its proper position for clamping the tool in precisely the same axial position as before.

Preferably the holder further includes means automatically causing the upper clamp member to undergo upward pivotal movement (preferably, limited upward pivotal movement) relative to the lower clamp member on loosening the securing means of (d). In accordance with a preferred embodiment of this invention, the holder is further characterized in that the upper and lower clamp members each have at least one—most preferably more than one—cylindrical aperture extending downwardly therethrough, the respective apertures being concentrically alignable with each other, the diameter of the aperture of the upper clamp member being larger than that of the lower clamp member, and in that the fastening means of (e) comprise for each such pair of concentrically alignable apertures:
  (i) a machine cap screw adapted to pass downwardly through said concentrically aligned apertures and to be threadably secured into a support member for said holder; and
  (ii) a cylindrical bushing having (1) an outer diameter less than the diameter of the aperture of the upper clamp member but greater than the diameter of the aperture of the lower clamp member, (2) an inner diameter at least equal to the outer diameter of said cap screw, and (3) a length in excess of the length of the aperture of the upper clamp member so that the bushing
    extends upwardly above said upper clamp member when said cap screw threadably secures said bushing and said lower clamp member onto the support member for the holder, and
    permits said upper clamp member to undergo pivotal movement relative to the fastened lower clamp member when the securing means of (d) are loosened. It is also preferred that one or more washers be fitted between the cap screw and the upper end of the bushing. Such washers will thus have an inner diameter at least equal to the outer diameter of the cap screw but less than the diameter of the cap of the screw, and the washers will be sized and adapted to rest upon the upper end of the bushing and to be secured thereagainst by the cap screw. It will be appreciated of course that when such washers are employed, it is not necessary (although it is desirable) that the inner diameter of the bushing be less than the diameter of the cap of the cap screw, as the washer itself can serve in effect as a radial extension of the perimeter of the cap to overlie the upper end of the bushing.

The foregoing preferred embodiment not only enables the upper clamp member to be loosened from the lower clamp member without losing the axial alignment of the tool, but enables the entire holder and tool to be removed from the support without loosening the tool. Thus where desired, individual tools and tool holders may be interchanged with each other as units without making any adjustment in the position of the tools in their respective holders.

Most preferably, each of the clamp members has a plurality of linear recesses adjacent each other. These recesses are of different sizes and are positioned to be placed in registration with the respective comparably or correspondingly sized recesses of the other clamp member. Thus when in registration these respective recesses snugly receive linear segments of tools of different sizes and thereby make it possible for the device to receive and tightly secure boring bars or other similar tools of differing sizes. Since boring bars are normally cylindrically shaped, preferably the linear recesses in the respective clamp members are semi-circular recesses so that when the upper and lower clamp members are secured together with the recesses in registration with each other, cylindrically shaped linear apertures are formed for snugly receiving and clamping a correspondingly sized cylindrically shaped gripping segment of the tool.

While various arrangements may be used for securing the upper and lower clamp members together along one side thereof to enable pivotal movement of the upper clamp member relative to the lower clamp member (e.g., hinges, etc.), a preferred construction involves a pair of superposed interlockable linear tongue and groove joints extending laterally in opposite horizontal directions relative to each other, one of the tongues and one of the grooves being in the lower clamp member and the other of the tongues and other of the grooves being in the upper clamp member so that the tongue of each of the clamp members is accommodated by the groove of the other clamp member, the respective grooves being slightly oversized relative to the respective tongues thereby enabling the upper clamp member to undergo limited pivotal movement relative to the lower clamp member when these joints are interlocked.

The foregoing interlockable construction is extremely durable since it contains no moving parts or separately attached parts as such—only integral machined parts made of steel or the like. In fact, the clamp members are not actually fastened together but rather are interlocked in a freely detachable manner. Furthermore, such construction affords an exceptionally high degree of precision in alignment of the clamp members and the tool being held thereby since there are no surfaces or parts in the construction that can be readily distorted or worn during repeated, heavy duty usage. It is interesting to note that the freely separable interlocking portions of the clamp members are kept interlocked by the tool being held by the holder itself even when the clamp members are not otherwise secured together by the means of (d). Thus the holder secures the tool and the tool helps secure the holder.

These and other embodiments, features, and advantages of this invention will be still further apparent from the ensuing description, appended claims, and accompanying drawings.

SUMMARY OF THE DRAWINGS

In the drawings wherein like numerals represent like parts:

FIG. 3 is a side view of the tool holder of FIG. 1;

FIG. 4 is an enlarged fragmentary front view of the preferred type of interlocking arrangement shown in FIG. 1 for securing the upper and lower clamp members together along one side thereof, FIG. 4 illustrating in exaggerated fashion (for ease of understanding) the upward pivotal movement made possible for the upper clamp member relative to the lower clamp member by virtue of this interlocking arrangement; and FIG. 5 is an enlarged fragmentary front view as in FIG. 4 except that the parts of the interlocking arrangement are shown separated from each other.

DESCRIPTION OF PREFERRED EMBODIMENTS

Figure 1:
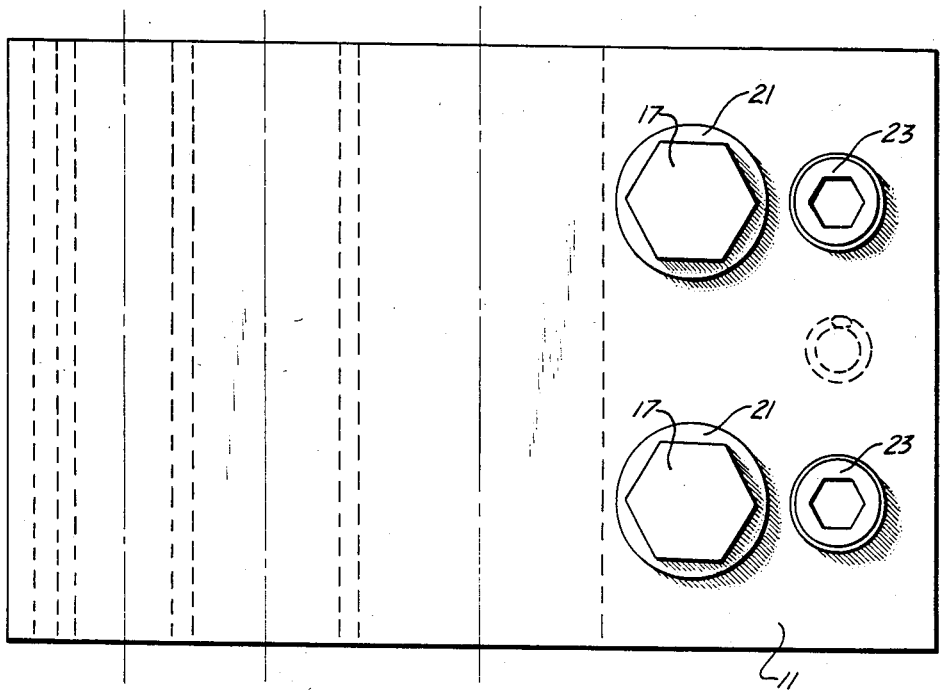
FIG. 1 is a top view of a preferred adjustable holder of this invention.
Figure 2:
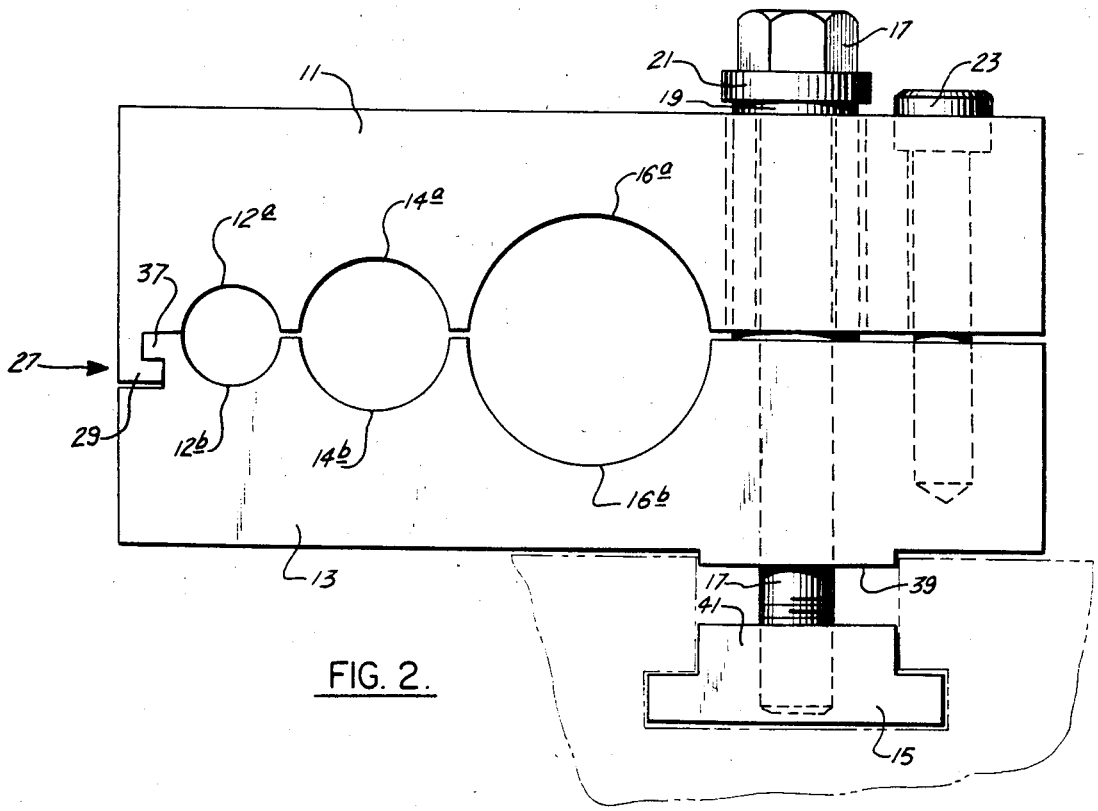
FIG. 2 is a front view of the tool holder of FIG. 1.

In the preferred form depicted, the holder comprises upper clamp member 11, lower clamp member 13, base clamp 15, machine screws 17, 17, bushings 19, 19, washers 21, 21, machine screws 23, 23, and spring 25. As shown in FIG. 2 and as indicated by phantom lines and centerlines in FIG. 1, clamp member 11 has a plurality of linear recesses 12a, 14a, 16a of progressively increased size, and clamp member 13 has an equal number of linear recesses 12b, 14b, 16b of sizes corresponding to recesses 12a, 14a, 16a, respectively, and positioned to be placed in registration therewith (as best indicated in FIG. 2). In the form depicted recesses 12a and 12b, 14a and 14b, and 16a and 16b, are semicircular recesses and thus form cylindrical linear apertures of differing diameters to accommodate the cylindrical shanks of differently sized boring bars or other tools (not shown). It will be understood, of course, that the recesses may be of any desired configuration to snugly receive and securely fasten or grip the tool positioned therein.

Depending from the bottom of clamp member 11 along one side edge thereof is an L-shaped flange 27 which defines both a bead or tongue 29 and a groove 31. Positioned along the adjacent upper side edge of clamp member 13 is an L-shaped recess 33 which defines both a groove 35 positioned to receive tongue 29 and a bead or tongue 37 positioned to fit into groove 31. As best seen in FIG. 4, groove 35 is "wider" (vertically higher) than tongue 29 and groove 31 is "wider" (vertically higher) than tongue 37 so that when interlocked as depicted in FIG. 4, clamp member 11 is able to undergo limited upward pivotal movement relative to clamp member 13.

By way of example, with an L-shaped flange 27 extending downwardly 0.5 inch, with its tongue 29 extending inwardly 0.5 inch from the outer edge and being about 0.25 inch in length and in thickness, and with an L-shaped recess 33 extending downwardly about 0.5 inch with groove 35 extending inwardly about 0.5 inch from the outer edge and tongue 37 being about 0.25 inch in length and in thickness, a tolerance of about 0.010 inch as between the respective thicknesses (vertical heights) of tongues 29 and 37 and the respective widths (vertical heights) of grooves 35 and 31 in a holder approximately 9.5 inches in width provides a clearance of approximately 1/16 inch between clamp members 11 and 13 on the side opposite the side this interlocking construction. In other words, with these dimensions and tolerances upper clamp member 11 is able to pivot upwardly relative to lower clamp member 13 to provide at the right side of FIG. 2 a gap of about 1/16 inch therebetween. Such limited pivotal movement is entirely adequate for making adjustments of tool positions within the tool holder. It will be apparent of course that any suitable dimensions and tolerances may be employed in this preferred interlocking construction, the foregoing being presented merely as an illustrative example.

It will also be readily apparent that L-shaped flange 27 may be integral with an extend upwardly from the top of lower clamp member 13 and that L-shaped recess 33 may be positioned in the adjacent lower edge portion of upper clamp member 11. In other words, the interlockable L-shaped flange and L-shaped recess depicted in FIGS. 2, 4 and 5 may be inverted.

As indicated in FIGS. 2 and 3, machine screws 23, 23 extend through appropriately-sized apertures in upper clamp member 11 and into aligned appropriately-sized interiorly threaded apertures in lower clamp member 13 and thereby enable these clamp members to be tightened on and loosened from a tool positioned in the appropriate recess of the holder.

Spring 25 is positioned in an annular recess in lower clamp member 13 and extends into a concentrically aligned annular recess in upper clamp member 11 (note FIG. 3). Thus when upper clamp member 11 is tightened onto lower clamp member 13 by means of machine screws 23, 23, spring 25 is placed under compression. Upon loosening machine screws 23, 23, the force exerted by spring 25 causes the clamp members to pivotally separate from each other.

Machine screws 17, 17 extend through concentrically aligned apertures in clamp members 11 and 13 and are received in internally threaded apertures in base clamp 15. In the preferred form depicted (note FIGS. 2 and 3), the underside of lower clamp member 13 has a downwardly extending linear key 39 sized to fit into the compound of a lathe or other like support for the tool holder. The upper portion of base clamp 15 is also provided with a correspondingly sized and shaped upwardly extending linear key 41. Thus on tightening machine screws 17, 17 the holder can be easily fastened to the lathe or other support by means of the clamping action between base clamp member 15 and the underside of lower clamp member 13 on the opposed spaced-apart inwardly directed horizontal flanges of the compound (note FIG. 2). The spaced-apart keys 39 and 41 thus facilitate mounting of the tool holder in the compound and enable the tool holder to be very securely fastened to the lathe or like support by clamping action.

As indicated in FIG. 2, the apertures in upper clamp member 11 have larger diameters than the outer diameters of bushings 19, 19. The inner diameters of bushings 19, 19 are, in the form depicted, larger than the diameter of machine screws 17, 17 which extend therethrough, although as noted above, the inner diameters of the bushings may be equal to the outer diameters of these machine screws, if desired. As also indicated in FIG. 2, the length of bushings 19, 19 exceeds the length of apertures in upper clamp member 11 so that when seated on the upper surface of lower clamp member 13, bushings 19, 19 extend above the upper surface of upper clamp member 11. Washers 21, 21 are seated atop bushings 19, 19.

It can be seen therefore that when machine screws 17, 17 are tightened to fasten the holder in the compound of the lathe or the like, this securing force is directed via washers 21, 21 and their underseated bushings 19, 19 against lower clamp member 13. With machine screws 23, 23 unfastened, upper clamp member 11 is at liberty to undergo upward pivotal movement even though lower clamp member 13 is tightly secured to the lathe or other underlying support. Since the apertures in upper clamp member 11 are oversized relative to bushings 19, 19, this limited pivotal movement is not interfered with by the upper clamp member. Thus lower clamp member 13 can be secured to the lathe or like support by means of machine screws 17, 17, washers 21, 21, bushings 19, 19, and base clamp member 15 and yet upper clamp member 11 may undergo pivotal movement relative to the fastened lower clamp member 13 on loosening machine screws 23, 23, such pivotal movement being automatically facilitated and achieved at least in part by the force applied by spring 25 tending to separate the upper and lower clamp members.

It is thought that the invention and many of its attendant advantages will be understood from the foregoing description and it will be apparent that various changes may be made in the form, construction, and arrangement of the parts without departing from the spirit and scope of this invention, the forms hereinbefore described being merely preferred embodiments thereof.

I claim:
1. An adjustable holder for tools which comprises:
  (a) a lower clamp member having at least one recess therein adapted to snugly receive a lower portion of a segment of a tool;
  (b) an upper clamp member distinct from and adapted to be positioned on top of said lower clamp member, said upper clamp member having at least one recess therein adapted to snugly receive an upper portion of a segment of the tool above the lower portion of said segment received by said lower clamp member;
  (c) first means integral with said lower clamp member and second means integral with said upper clamp member, said first and second means being interlockable with each other in a generally horizontal direction to secure said clamp members together along one side thereof and to prevent vertical disengagement between said clamp members, said first and second means nevertheless enabling pivotal movement of said upper clamp member relative to said lower clamp member;
  (d) securing means adapted to secure said clamp members together, said securing means being positioned in proximity to the side of said clamp members opposite the side secured by the means of (c); and
  (e) fastening means adapted to secure said lower clamp member to a support member for said holder whereby said upper clamp member may undergo pivotal movement relative to the fastened lower clamp member on loosening the securing means of (d).

2. Apparatus in accordance with claim 1 further including means automatically causing said upper clamp member to undergo upward pivotal movement relative to said lower clamp member on loosening the securing means of (d).

3. Apparatus in accordance with claim 1 wherein the underside of said lower clamp member has a downwardly-extending linear key adapted to fit into the compound of a lathe or the like.

4. Apparatus in accordance with claim 1 further characterized in that said clamp members have at least one cylindrical aperture extending downwardly therethrough, the apertures being concentrically alignable with each other, the diameter of the aperture of the upper clamp member being larger than that of the lower clamp member, and in that said fastening means of (e) comprise for each such pair of concentrically alignable apertures:
  (i) a machine cap screw adapted to pass downwardly through said concentrically aligned apertures and to be threadably secured into the support member for said holder; and
  (ii) a cylindrical bushing having (1) an outer diameter less than the diameter of the aperture of the upper clamp member but greater than the diameter of the aperture of the lower clamp member, (2) an inner diameter at least equal to the outer diameter of said cap screw, and (3) a length in excess of the length of the aperture of the upper clamp member so that the bushing extends upwardly above said upper clamp member when said cap screw threadably secures said bushing and said lower clamp member onto the support member for said holder, and permits said upper clamp member to undergo pivotal movement relative to the fastened lower clamp member when the securing means of (d) are loosened.

5. Apparatus in accordance with claim 4 wherein said fastening means of (e) further include at least one washer having and inner diameter at least equal to the outer diameter of said cap screw but less than the diameter of the cap of said screw, said washer being sized and adapted to rest on the upper end of said bushing and to be secured thereagainst by said cap screw.

6. Apparatus in accordance with claim 4 wherein said fastening means of (e) further include a separate base clamp member having at least one internally threaded aperture to threadably receive said cap screw, said base clamp member being adapted to be secured on the underside of a pair of opposed, spaced-apart, inwardly-directed horizontal flanges of said support member by clamping action when said cap screw is tightened.

7. Apparatus in accordance with claim 6 further characterized in that the top of said separate base clamp member has an upwardly extending linear key adapted to fit into the space between said pair of opposed, spaced-apart, inwardly-directed horizontal flanges of the support member.

8. Apparatus in accordance with claim 7 further characterized in that the underside of said lower clamp member has a downwardly-extending linear key adapted to fit into the space between said pair of opposed, spaced-apart, inwardly-directed horizontal flanges of the support member.

9. Apparatus in accordance with claim 4 wherein said clamp members each have at least two of said apertures, and wherein said fastening means of (e) comprise at least two of said cap screws and at least two of said bushings.

10. Apparatus in accordance with claim 9 wherein each said fastening means of (e) further includes at least one washer having an inner diameter at least equal to the outer diameter of the cap screw thereof but less than the diameter of the cap of said screw, said washer being sized and adapted to rest on the upper end of the bushing thereof and to be secured thereagainst by said cap screw.

11. Apparatus in accordance with claim 9 wherein said fastening means of (e) further include a separate base clamp member having at least two internally threaded apertures to threadably receive said cap screws, said base clamp member being adapted to be secured on the underside of a pair of opposed, spaced-apart, inwardly-directed horizontal flanges of said support member by clamping action when at least one of said cap screws is tightened.

12. Apparatus in accordance with claim 11 further characterized in that the top of said separate base clamp member has an upwardly extending linear key adapted to fit into the space between said pair of opposed, spaced-apart, inwardly-directed horizontal flanges of the support member.

13. Apparatus in accordance with claim 12 further characterized in that the underside of said lower clamp member has a downwardly-extending linear key adapted to fit into the space between said pair of opposed, spaced-apart, inwardly-directed horizontal flanges of the support member.

14. Apparatus in accordance with claim 1 wherein each of said clamp members has a plurality of said recesses therein adjacent each other, said recesses being linear recesses of different sizes and positioned to be placed in registration with the respective comparably sized recesses of the other clamp member so as to snugly receive when in registration, linear segments of tools of different sizes.

15. Apparatus in accordance with claim 1 wherein said recesses in the respective clamp members are semicircular linear recesses so that when said clamps are secured together the respective recesses form a cylindrically-shaped linear aperture for snugly receiving and clamping a correspondingly sized linear cylindrically-shaped segment of a tool.

16. Apparatus in accordance with claim 15 further characterized in that the top of said separate base clamp member has an upwardly extending linear key adapted to fit into the space between said pair of opposed, spaced-apart, inwardly-directed horizontal flanges of the support member.

17. Apparatus in accordance with claim 16 further characterized in that the underside of said lower clamp member has a downwardly-extending linear key adapted to fit into the space between said pair of opposed, spaced-apart, inwardly-directed horizontal flanges of the support member.

18. Apparatus in accordance with claim 17 further characterized in that said apparatus further includes means automatically causing said upper clamp member of (b) to undergo upward pivotal movement relative to said lower clamp member of (a) on loosening the securing means of (d).

19. An adjustable holder for tools which comprises:
(a) a lower clamp member having at least one linear recess therein adapted to snugly receive a lower portion of a linear segment of a tool;
(b) an upper clamp member adapted to be positioned on top of said lower clamp member, said upper clamp member having at least one linear recess therein adapted to snugly receive an upper portion of a linear segment of the tool above the lower portion of said segment received by said lower clamp member;
(c) means adapted to secure said clamp members together along one side thereof and to enable pivotal movement of said upper clamp member relative to said lower clamp member, said means comprising a pair of superposed interlockable linear tongue and groove joints extending laterally in opposite horizontal directions relative to each other, one of said tongues and one of said grooves being in said lower clamp member and the other of said tongues and the other of said grooves being in said upper clamp member so that the tongue of each of said clamp members is accommodated by the groove of the other of said clamp members, the respective grooves being slightly oversized relative to the respective tongues thereby enabling the upper clamp member to undergo limited pivotal movement relative to said lower clamp member when said joints are interlocked;

(d) securing means adapted to secure said clamp members together, said securing means being positioned in proximity to the side of said clamp members opposite the side secured by the means of (c); and (e) fastening means adapted to secure said lower clamp member to a support member for said holder whereby said upper clamp member may undergo pivotal movement relative to the fastened lower clamp member on loosening the securing means of (d).

20. Apparatus in accordance with claim 19 further characterized in that (1) each of said clamp members of (a) and (b) has a plurality of said linear recesses therein adjacent each other, said recesses being of different sizes and positioned to be placed in registration with the respective comparably sized recesses of the other clamp member so as to snugly receive when in registration, linear segments of tools of different sizes;

(2) said clamp members of (a) and (b) have at least one cylindrical aperture extending downwardly therethrough, the apertures being concentrically alignable with each other, the diameter of the aperture of the upper clamp member of (b) being larger than that of the lower clamp member of (a);

(3) said fastening means of (e) comprise:

(i) at least one machine cap screw adapted to pass downwardly through said concentrically aligned pair of apertures and to be threadably secured into the support member for said holder; and (ii) at least one cylindrical bushing having (1) an outer diameter less than the diameter of the aperture of the upper clamp member but greater than the diameter of the aperture of the lower clamp member, (2) an inner diameter at least equal to the outer diameter of said cap screw, and (3) a length in excess of the length of the aperture of the upper clamp member so that the bushing extends upwardly above said upper clamp member when said cap screw threadably secures said busing and said lower clamp member onto the support member for said holder, and permits said upper clamp member to undergo pivotal movement relative to the fastened lower clamp member when the securing means of (d) are lossened; and (4) said support member for said holder comprises a separate base clamp member having at least one internally threaded aperture to threadably receive said cap screw, said base clamp member being adapted to be secured on the underside of a pair of opposed, spaced-apart, inwardly-directed horizontal flanges of said support member by clamping action when said cap screw is tightened.

21. An adjustable holder for tools which comprises:

(a) a lower clamp member having at least one linear recess therein adapted to snugly receive a lower portion of a linear segment of a tool;

(b) an upper clamp member distinct from and adapted to be positioned on top of said lower clamp member, said upper clamp member having at least one linear recess therein adapted to snugly receive an upper portion of a linear segment of the tool above the lower portion of said segment received by said lower clamo member;

(c) first means integral with said lower clamp member and second means integral with said upper clamp member, said first and second means being interlockable with each other in a generally horizontal direction to secure said clamp members together along one side thereof and to prevent vertical disengagement between said clamp members, said first and second means nevertheless enabling pivotal movement of said upper clamp member relative to said clamp member;

(d) securing means adapted to secure said clamp members together, said securing means being positioned in proximity to the side of said clamp members opposite the side secured by the means of (c); and (e) fastening means adapted to secure said lower clamp member to a support member for said holder whereby said upper clamp member may undergo pivotal movement relative to the fastened lower clamp member on loosening the securing means of (d);

said adjustable holder being further characterized in that:

(f) said clamp members each have at least two cylindrical apertures extending downwardly therethrough, the apertures being concentrically alignable with each other, the diameter of the aperture of the upper clamp member being larger than that of the lower clamp member; and (g) said fastening means of (e) comprise for each such pair of concentrically allignable apertures:

(i) a machine cap screw adapted to pass downwardly through said concentrically aligned pair of apertures and to be threadably secured into the support member for said holder; and (ii) a cylindrical bushing having (1) an outer diameter less than the diameter of the aperture of the upper clamp member but greater than the diameter of the aperture of the lower clamp member, (2) an inner diameter at least equal to the outer diameter of said cap screw, and (3) a length in excess of the length of the aperture of the upper clamp member so that the bushing extending upwardly above said upper clamp member when said cap screw threadably secures said bushing and said lower clamp member onto the support member for said holder, and permits said upper clamp member to undergo pivotal movement relative to the fastened lower clamp member when the securing means of (d) are loosened.

* * * * *

UNITED STATES PATENT AND TRADEMARK OFFICE
CERTIFICATE OF CORRECTION

PATENT NO.   : 4,569,262
DATED        : FEBRUARY 11, 1986
INVENTOR(S)  : JOHN J. SZUSH, JR.

It is certified that error appears in the above-identified patent and that said Letters Patent is hereby corrected as shown below:

Column 8, line 24, reads "claim 15" and should read
-- claim 20 --.

Column 9, line 48, reads "busing" and should read
-- bushing --;

Column 9, line 53, reads "lossened" and should read
-- loosened --.

Column 10, line 10, reads "clamo" and should read
-- clamp --.

Column 10, line 41, reads "allignable" and should read
-- alignable --.

Column 10, line 54, reads "extending" and should read
-- extends --.

Signed and Sealed this

Sixth Day of May 1986

[SEAL]

Attest:

DONALD J. QUIGG

Attesting Officer

Commissioner of Patents and Trademarks